(12) United States Patent
Wang et al.

(10) Patent No.: US 11,461,207 B1
(45) Date of Patent: Oct. 4, 2022

(54) ELECTRONIC DEVICE AND DEBUG MODE TRIGGERING METHOD

(71) Applicant: PixArt Imaging Inc., Hsin-Chu (TW)

(72) Inventors: Chien-Zhi Wang, Hsin-Chu (TW); Jr-Yi Li, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/525,990

(22) Filed: Nov. 15, 2021

(51) Int. Cl.
*G06F 11/273* (2006.01)
*G06F 11/263* (2006.01)
*G06F 11/27* (2006.01)
*G06F 11/277* (2006.01)
*G06F 3/0487* (2013.01)
*G06F 3/03* (2006.01)

(52) U.S. Cl.
CPC ........ *G06F 11/2733* (2013.01); *G06F 3/0304* (2013.01); *G06F 3/0487* (2013.01); *G06F 11/263* (2013.01); *G06F 11/27* (2013.01); *G06F 11/277* (2013.01); *G06F 2203/04808* (2013.01)

(58) Field of Classification Search
CPC .. G06F 11/2733; G06F 3/0304; G06F 3/0487; G06F 11/263; G06F 11/27; G06F 11/277; G06F 2203/04808
See application file for complete search history.

(56) References Cited

U.S. PATENT DOCUMENTS

| | | | |
|---|---|---|---|
| 11,150,748 B1* | 10/2021 | Tan ........................ | G06F 3/0383 |
| 2009/0271168 A1* | 10/2009 | Minto ..................... | G06F 30/20 |
| | | | 703/17 |
| 2011/0032539 A1* | 2/2011 | Chang ................... | G06F 3/0317 |
| | | | 356/614 |

* cited by examiner

Primary Examiner — Jonathan A Boyd
(74) Attorney, Agent, or Firm — Winston Hsu

(57) ABSTRACT

An electronic device, which can enter a debug mode, comprising: a plurality of buttons, wherein a layout of the buttons correspond to one of a first button layout and a second button layout; a processing circuit, configured to control the electronic device to enter a debug mode when at least two of the buttons are pressed to meet a predetermined button combination. The processing circuit controls the electronic device to perform a first test corresponding to the first button layout or to perform a second test corresponding to the second button layout to detect which one of the first button layout and the second button layout does the electronic device correspond to.

20 Claims, 4 Drawing Sheets

- Determine if at least two of the buttons are pressed to meet a predetermined button combination — 601
- Control the electronic device to enter a debug mode if the at least two of the buttons are pressed to meet a predetermined button combination — 603
- Control the electronic device to perform a first test corresponding to the first button layout or to perform a second test corresponding to the second button layout to detect which one of the first button layout and the second button layout does the electronic device correspond to — 605

ELECTRONIC DEVICE AND DEBUG MODE TRIGGERING METHOD

BACKGROUND OF THE INVENTION

1. Field of the Invention

The present invention relates to an electronic device and a debug mode triggering method, and particularly relates to an electronic device and a debug mode triggering method which can trigger the debug mode no matter which button layout does the electronic device have.

2. Description of the Prior Art

A conventional optical mouse may need to enter a debug mode in which the parameters of the optical mouse can be calibrated by an engineer or a maintenance staff. The buttons of the optical mouse may correspond to various button layouts. However, the engineer or the maintenance staff is hard to acquire information of the button layout while calibrating the optical mouse. Therefore, the optical mouse may enter a wrong debug mode or could not enter the debug bode since the correct button layout is not known.

SUMMARY OF THE INVENTION

One objective of the present invention is to provide an electronic device which can enter the debug mode no matter which button layout does the optical mouse have.

Another objective of the present invention is to provide a debug mode triggering method which can trigger the debug mode no matter which button layout does the optical mouse have.

One embodiment of the present invention discloses an electronic device, which can enter a debug mode, comprising: a plurality of buttons, wherein a layout of the buttons correspond to one of a first button layout and a second button layout; a processing circuit, configured to control the electronic device to enter a debug mode when at least two of the buttons are pressed to meet a predetermined button combination. The processing circuit controls the electronic device to perform a first test corresponding to the first button layout or to perform a second test corresponding to the second button layout to detect which one of the first button layout and the second button layout does the electronic device correspond to.

Another embodiment of the present invention discloses a debug mode triggering method, for an electronic device comprising a plurality of buttons, comprising: (a) determining if at least two of the buttons are pressed to meet a predetermined button combination, wherein a layout of the buttons corresponds to one of a first button layout and a second button layout; (b) controlling the electronic device to enter a debug mode if the at least two of the buttons are pressed to meet a predetermined button combination; and (c) controlling the electronic device to perform a first test corresponding to the first button layout or to perform a second test corresponding to the second button layout to detect which one of the first button layout and the second button layout does the electronic device correspond to.

In view of above-mentioned embodiments, the button layout can be automatically detected and the optical mouse can enter the debug mode no matter which button layout does the optical mouse have.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Furthermore, in following embodiments, an optical mouse is used as an example to explain the concepts of the present invention. However, the debug mode triggering method provided by the present invention can be applied to any other electronic device (e.g., an optical navigation device).

Figure 1:
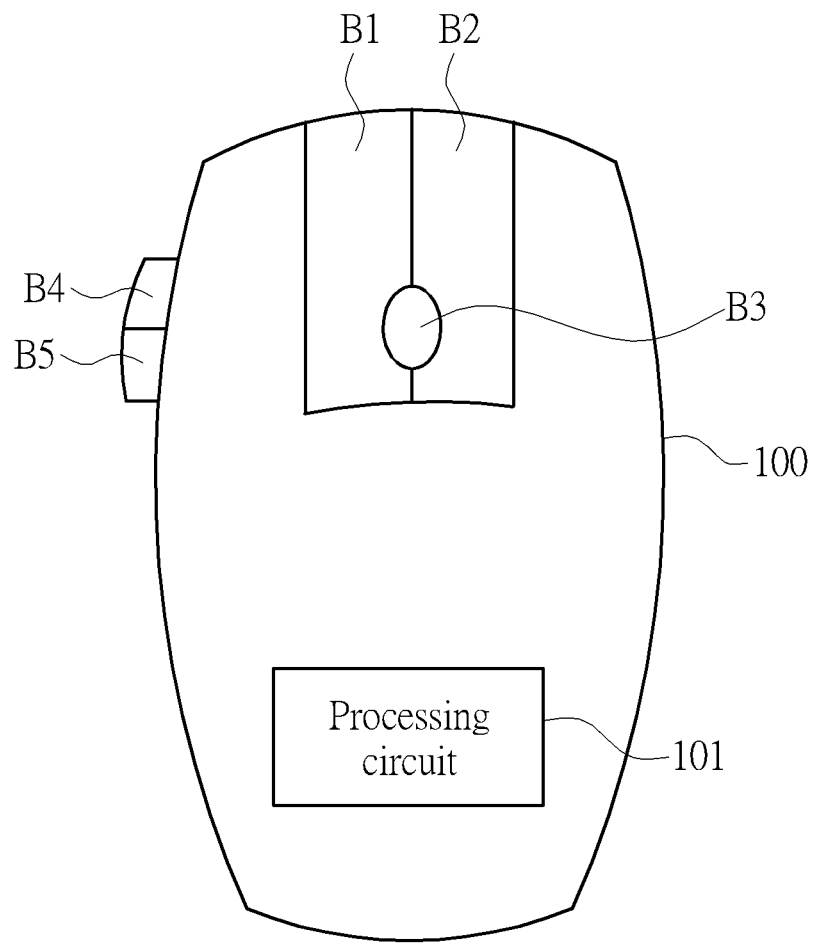
FIG. 1 is a schematic diagram illustrating an optical mouse according to one embodiment of the present invention.

FIG. 1 is a schematic diagram illustrating an optical mouse 100 according to one embodiment of the present invention. As illustrated in FIG. 1, the optical mouse 100 comprises a plurality of buttons B1, B2, B3, B4, B5 and a processing circuit 101. Please note, the optical mouse 100 is not limited to comprise five buttons B1-B5. A number and/or an arrangement of the buttons of the optical mouse 100 can be different from the example illustrated in FIG. 1. The buttons B1-B5 correspond to one of a first button layout and a second button layout, which also means the buttons B1-B5 correspond to one of various buttons layouts. Also, the processing circuit 101 is configured to control the optical mouse 100 to enter a debug mode when at least two of the buttons B1-B5 are pressed to meet a predetermined button combination. For example, buttons B1, B2 and B5 are pressed, or buttons B3, B4, B5 are pressed. The predetermined button combination can comprise more than one combination. For example, buttons B1, B2 are pressed and then the buttons B3, B4 are pressed.

The optical mouse 100 can further comprise an image sensor, and the processing circuit 101 determines a location of the optical mouse according to images sensed by the image sensor.

The above-mention debug mode can mean a mode in which the optical mouse 100 can be tested to determine whether it has errors or not, or a mode in which the parameters of the optical mouse 100 can be calibrated to make the optical mouse 100 can have a better performance. In one embodiment, the debug mode means the optical mouse 100 allows the firmware or the program stored therein can be changed, or allows a new program or firmware can be written therein.

In one embodiment, after the predetermined button combination is met, the processing circuit 101 controls the optical mouse 100 to perform a first test corresponding to the first button layout or to perform a second test corresponding to the second button layout to detect which one of the first button layout and the second button layout does the optical mouse 100 correspond to. Briefly, after the predetermined button combination is met, the optical mouse 100 detects which one of the first button layout and the second button layout it has, thereby the optical mouse 100 can be calibrated more accurately in the debug mode.

In one embodiment, after at least two of the buttons are pressed to meet the predetermined button combination, the processing circuit 101 controls the optical mouse 100 to perform the first test, and then controls the optical mouse 100 to perform the second test if a result of the first test indicates that the buttons does not have the first button layout.

In another embodiment, after at least two of the buttons are pressed to meet the predetermined button combination, the processing circuit 101 controls the optical mouse 100 to perform the first test, and then does not control the optical mouse 100 to perform the second test if a result of the first test indicates that the buttons have the first button layout.

In still another embodiment, the processing circuit 101 controls the optical mouse 100 to simultaneously perform the first test and the second test, after at least two of the buttons are pressed to meet the predetermined button combination.

The first test and the second first can be, for example, detect voltages of some components or some terminals inside the optical mouse 100, or send some signals to detect the output signals of some terminals. By this way, the type of the button layout can be detected. It will be appreciated that the steps of testing button layouts are not limited to above-mentioned examples.

In one embodiment, the above-mentioned buttons layouts means the circuitry connected between a circuit or an IC (integrated circuit) inside the optical mouse 100 and the buttons B1-B5 on the optical mouse 100. Via the circuitry, when any one of the buttons B1-B5 is pressed, a corresponding signal can be generated by the circuit or the IC inside the optical mouse 100 to control the optical mouse 100.

Figure 2:
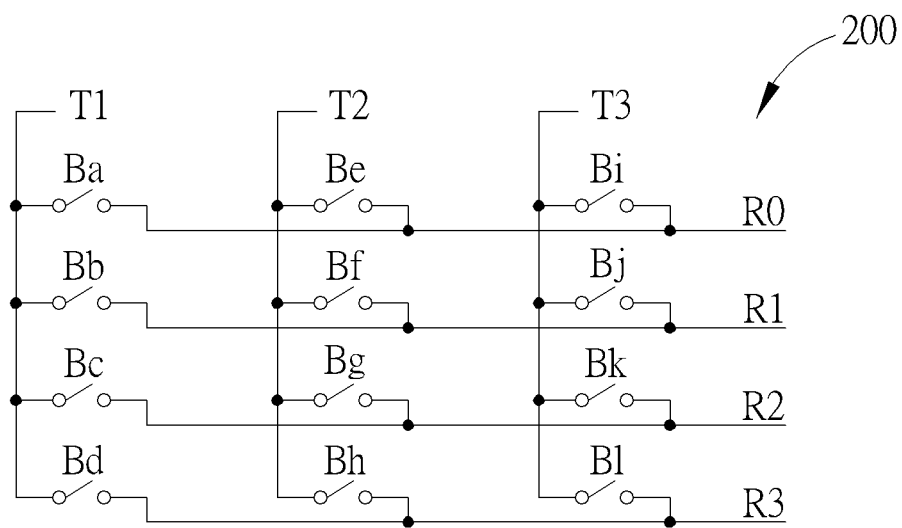
FIG. 2 and FIG. 3 are schematic diagrams illustrating two examples of the button layouts, according to embodiments of the present invention.
Figure 3:
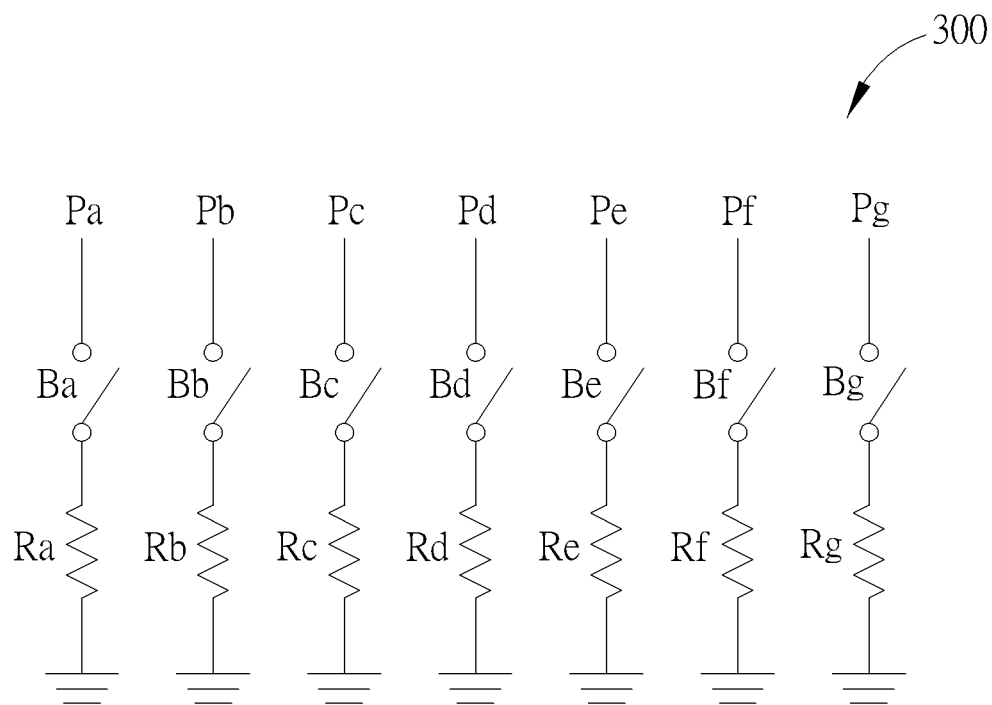

Button layouts of the optical mouse 100 can have various structures. FIG. 2 and FIG. 3 are schematic diagrams illustrating two examples of the button layouts, according to embodiments of the present invention. As illustrated in FIG. 2, the button layout 200, which can be named as "KeyScan", comprises a plurality of switches Ba-Bl and a plurality of terminals T1-T3. Each of the switches Ba-Bl corresponds to a button of the optical mouse 100. Also, scan signals are alternately provided at the terminals T1-T3. If one of the buttons is pressed, a corresponding switch is conductive. Therefore, it can be known that which button is pressed via the scan signals.

The button layout 300 in FIG. 3, which can be named as "GPIO layout", uses pins of an IC inside the optical mouse 100. As illustrated in FIG. 3, the button layout 300 comprises switches Ba-Bg and resistors Ra-Rg. Each of the switches Ba-Bg corresponds to a button of the optical mouse 100 and is coupled between one of the resistors Ra-Rg and one of the pins Pa-Pg. The pins Pa-Pg are pins of an IC inside the optical mouse 100. The IC mentioned here can be responsible for various functions. For example, the IC can be the processing circuit 101 or an image sensor of the optical mouse 100, but can be an IC responsible of other functions. Further, in one embodiment, the resistors Ra-Rg are used as impedance matching, but not limited. Via the structure illustrated in FIG. 3, the IC having the pins Ra-Rg can be informed if any one of the buttons is pressed, to generate control signals to control the optical mouse 100.

Figure 4:
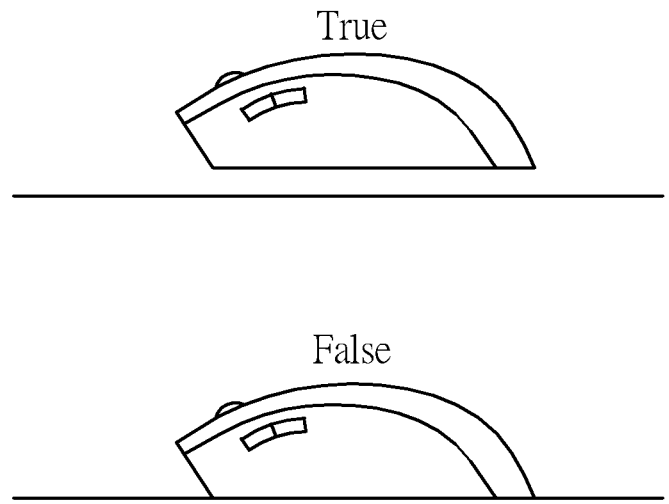
FIG. 4 and FIG. 5 are schematic diagrams illustrating how to trigger a debug mode of the optical mouse, according to embodiments of the present invention.
Figure 5:
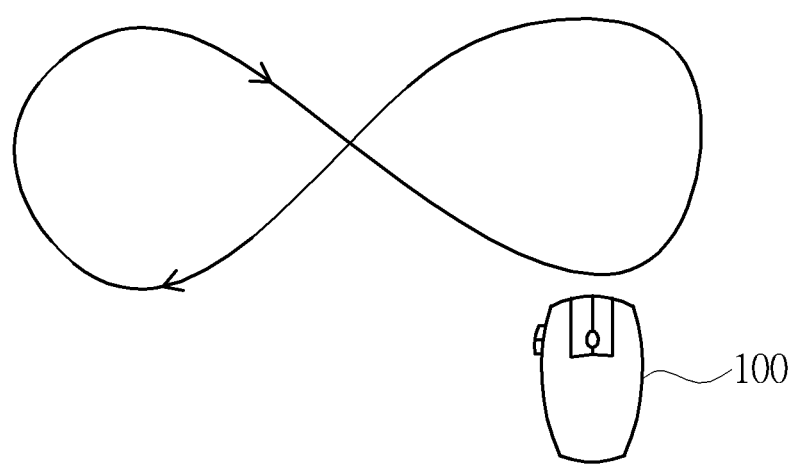

In the above-mentioned embodiments, the debug mode is triggered when the predetermined button combination is met (at least two of the buttons are pressed to meet the predetermined button combination). However, the debug mode triggering can further include other steps to trigger the debug mode. FIG. 4 and FIG. 5 are schematic diagrams illustrating how to trigger a debug mode of the optical mouse, according to embodiments of the present invention. In the embodiment of FIG. 4, the processing circuit 101 controls the optical mouse 100 to enter the debug mode when the predetermined button combination is met and the optical mouse 100 is in a lift mode. If the optical mouse 100 is in the lift mode, it means a bottom of the optical mouse 100 is away from a surface Sr for more than a predetermined distance, as shown in an upper diagram of FIG. 4. On the contrary, if the optical mouse 100 is not in the lift mode, it means a bottom of the optical mouse 100 touches the surface Sr, as shown in a lower diagram of FIG. 4. The surface Sr can be any kind of surface. For example, the surface Sr can be a desk or a mouse pad. The predetermined distance can be set to any desired value.

In the embodiment of FIG. 5, the processing circuit 101 controls the optical mouse 100 to enter the debug mode when the predetermined button combination is met and a movement of the optical mouse 100 meets a predetermined track in a predetermined time period. For example, the optical mouse 100 enters the debug mode when the predetermined button combination is met and a movement of the optical mouse 100 meets a horizontal 8 in a predetermined time period. Please note, the track can be replaced by any other track rather than limited to the horizontal 8.

In another embodiment, the processing circuit 101 controls the optical mouse 100 to enter the debug mode when the predetermined button combination is met in a predetermined time interval after the optical mouse 100 receives power. For example, the optical mouse 100 is connected to a computer and receives power when the computer is turned on. In such case, when the predetermined button combination is met in a predetermined time interval after the computer is turned on, the optical mouse 100 enters the debug mode. For another example, "receive power" means at least one battery with power is installed to the optical mouse 100.

The predetermined time interval can be set to any desired value. In one embodiment, the predetermined time interval is set as 21 seconds, thus the user has enough time to control the optical mouse 100 to enter the debug mode. Also, in another embodiment, the optical mouse 100 enters the debug mode if the predetermined button combination is met when the optical mouse 100 receives power. That is, the optical mouse 100 enters the debug mode if the buttons of the optical mouse 100 are already pressed to meet the predetermined button combination while the optical mouse 100 is receiving power.

Briefly, in the above-mentioned embodiments, the optical mouse 100 enters the debug mode when specific conditions are met and does not enter the debug mode when specific conditions are not met. The specific conditions can be: a predetermined button combination, a predetermined button combination and a lift mode, a predetermined button combination and a predetermined track, a predetermined button combination and receiving power.

Figure 6:
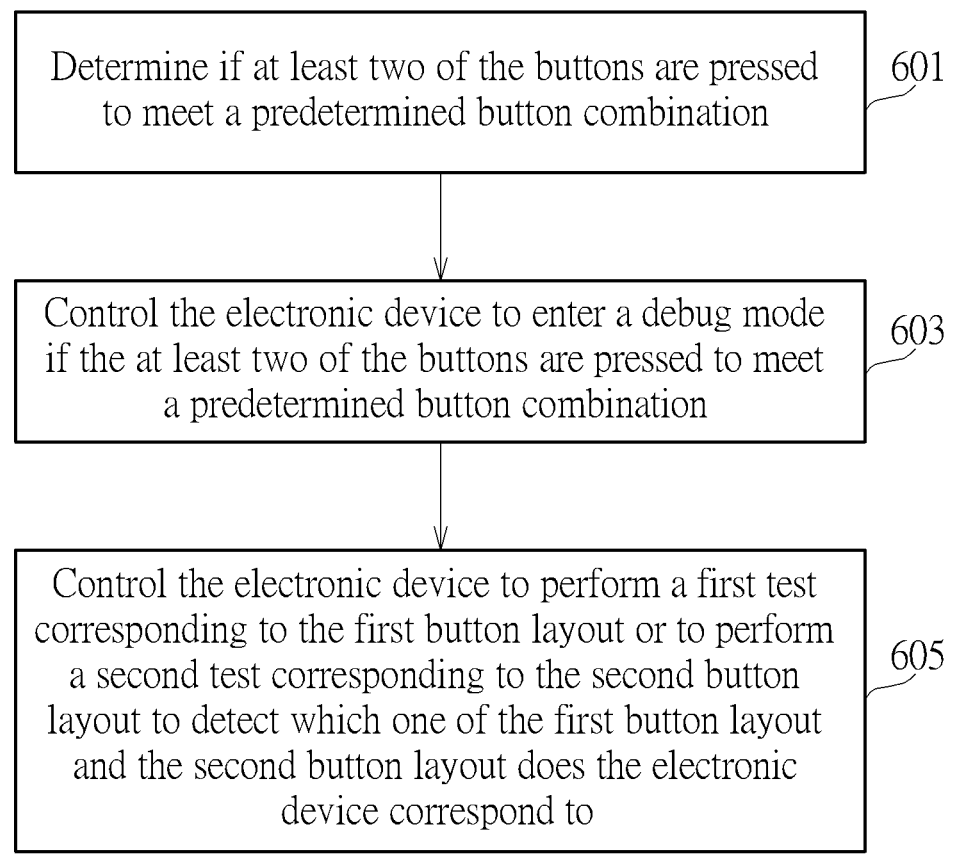
FIG. 6 is a flow chart illustrating a debug mode triggering method, according to one embodiment of the present invention.

In view of above-mentioned embodiments, a debug mode triggering method can be acquired. FIG. 6 is a flow chart illustrating a debug mode triggering method, applied to an electronic device comprising a plurality of buttons, according to one embodiment of the present invention. A layout of the buttons corresponds to one of a first button layout and a second button layout. The method in FIG. 6 comprises:

Step 601

Determine if at least two of the buttons are pressed to meet a predetermined button combination.

Step 603

Control the electronic device to enter a debug mode if the at least two of the buttons are pressed to meet a predetermined button combination.

Step 605

Control the electronic device to perform a first test corresponding to the first button layout or to perform a second test corresponding to the second button layout to detect which one of the first button layout and the second button layout does the electronic device correspond to.

Other detail steps can be acquired based on above-mentioned embodiments, thus are omitted for brevity here.

In view of above-mentioned embodiments, the button layout can be automatically detected and the optical mouse can enter the debug mode no matter which button layout does the optical mouse have.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, which can enter a debug mode, comprising:
    a plurality of buttons, wherein a layout of the buttons correspond to one of a first button layout and a second button layout;
    a processing circuit, configured to control the electronic device to enter a debug mode when at least two of the buttons are pressed to meet a predetermined button combination;
    wherein the processing circuit controls the electronic device to perform a first test corresponding to the first button layout or to perform a second test corresponding to the second button layout to detect which one of the first button layout and the second button layout does the electronic device correspond to.

2. The electronic device of claim 1, wherein the processing circuit controls the electronic device to enter the debug mode when at least two of the buttons are pressed to meet the predetermined button combination and the electronic device is in a lift mode.

3. The electronic device of claim 1, wherein the processing circuit controls the electronic device to enter the debug mode when at least two of the buttons are pressed to meet the predetermined button combination and a movement of the electronic device meets a predetermined track in a predetermined time period.

4. The electronic device of claim 1, wherein the processing circuit controls the electronic device to enter the debug mode when at least two of the buttons are pressed to meet the predetermined button combination in a predetermined time interval after the electronic device receives power.

5. The electronic device of claim 1, wherein the processing circuit controls the electronic device to enter the debug mode when at least two of the buttons are pressed to meet the predetermined button combination while the electronic device is receiving power.

6. The electronic device of claim 1, wherein after at least two of the buttons are pressed to meet the predetermined button combination, the processing circuit controls the electronic device to perform the first test, and then controls the electronic device to perform the second test if a result of the first test indicates that the buttons does not have the first button layout.

7. The electronic device of claim 1, wherein after at least two of the buttons are pressed to meet the predetermined button combination, the processing circuit controls the electronic device to perform the first test, and then does not control the electronic device to perform the second test if a result of the first test indicates that the buttons have the first button layout.

8. The electronic device of claim 1, wherein the processing circuit controls the electronic device to perform the first test and the second test, after at least two of the buttons are pressed to meet the predetermined button combination.

9. The electronic device of claim 1, wherein the electronic device is an electronic device.

10. The electronic device of claim 9, wherein the electronic device is an optical mouse.

11. A debug mode triggering method, for an electronic device comprising a plurality of buttons, comprising:
    (a) determining if at least two of the buttons are pressed to meet a predetermined button combination, wherein a layout of the buttons corresponds to one of a first button layout and a second button layout;
    (b) controlling the electronic device to enter a debug mode if the at least two of the buttons are pressed to meet a predetermined button combination; and
    (c) controlling the electronic device to perform a first test corresponding to the first button layout or to perform a second test corresponding to the second button layout to detect which one of the first button layout and the second button layout does the electronic device correspond to.

12. The debug mode triggering method of claim 11, wherein the step (b) further comprises:
    controlling the electronic device to enter the debug mode when at least two of the buttons are pressed to meet the predetermined button combination and the electronic device is in a lift mode.

13. The debug mode triggering method of claim 11, wherein the step (b) further comprises:
    controlling the electronic device to enter the debug mode when at least two of the buttons are pressed to meet the predetermined button combination and a movement of the electronic device meets a predetermined track in a predetermined time period.

14. The debug mode triggering method of claim 11, wherein the step (b) further comprises:
    controlling the electronic device to enter the debug mode when at least two of the buttons are pressed to meet the predetermined button combination in a predetermined time interval after the electronic device receives power.

15. The debug mode triggering method of claim 11, wherein the step (b) further comprises:
    controlling the electronic device to enter the debug mode when at least two of the buttons are pressed to meet the predetermined button combination while the electronic device is receiving power.

16. The debug mode triggering method of claim 11, further comprising:
    after at least two of the buttons are pressed to meet the predetermined button combination, controlling the electronic device to perform the first test, and then controlling the electronic device to perform the second test if a result of the first test indicates that the buttons does not have the first button layout.

17. The debug mode triggering method of claim 11, further comprising:
    after at least two of the buttons are pressed to meet the predetermined button combination, controlling the electronic device to perform the first test, and not controlling the electronic device to perform the second test if a result of the first test indicates that the buttons have the first button layout.

18. The debug mode triggering method of claim 11, further comprising:
    controlling the electronic device to perform the first test and the second test, after at least two of the buttons are pressed to meet the predetermined button combination.

19. The debug mode triggering method of claim 11, wherein the electronic device is an electronic device.

20. The debug mode triggering method of claim 19, wherein the electronic device is an optical mouse.

\* \* \* \* \*